Dec. 18, 1962            O. G. HØYER            3,068,911
APPARATUS FOR FILLING LIQUID OR PLASTIC MATERIAL
INTO FREEZING CELLS OF A REFRIGERATOR
Filed Dec. 14, 1959            10 Sheets-Sheet 1

Fig.1

INVENTOR
OLUF G. HØYER

BY Wenderoth, Lind & Ponack
ATTORNEYS

Dec. 18, 1962   O. G. HØYER   3,068,911
APPARATUS FOR FILLING LIQUID OR PLASTIC MATERIAL
INTO FREEZING CELLS OF A REFRIGERATOR
Filed Dec. 14, 1959   10 Sheets-Sheet 8

INVENTOR
OLUF G. HOYER

BY Wenderoth, Lind & Ponack
ATTORNEYS

United States Patent Office 3,068,911
Patented Dec. 18, 1962

3,068,911
APPARATUS FOR FILLING LIQUID OR PLASTIC MATERIAL INTO FREEZING CELLS OF A REFRIGERATOR
Oluf Gudmund Høyer, Ny Munkegade 131, Aarhus, Denmark
Filed Dec. 14, 1959, Ser. No. 859,272
8 Claims. (Cl. 141—115)

This invention relates to apparatus for filling liquid or plastic material into freezing cells of a refrigerator, particularly a stepwise rotatable ice-cream brick refrigerator, comprising a vertically movable filling unit having a plurality of filling tubes for pouring the material into the freezing cells from the bottom thereof and means for moving said filling unit vertically up and down.

Various problems are encountered in the operation of filling raw material into freezing cells of an ice-cream brick refrigerator. The quantity of material with which the cells are filled must be kept as constant as possible, and the filling must as far as possible take place in step with the upward motion of the filling unit so that the formation of air occlusions in the finished ice-cream brick is avoided. This is particularly important when using a raw material which at the time of the filling is already highly pre-frozen, as such materials will not flow as easily as materials which have not or only to a slight degree been pre-frozen. The highly pre-frozen cream entails a further difficulty as the quantity of cream which is present in the filling tube between the mouth thereof and the filling pump before the filling operation is started, will form a plug having a considerable adherence to the side walls of the filling tube. As the cream displays a certain compressibility a short time will elapse from the start of the pumping until the discharge of cream occurs at an even rate corresponding to the capacity of the pump. As a result hereof the finished ice-cream bricks will show a more or less pronounced constriction at their lower ends—with regard to the cells—which for several reasons, i.a. as regards sale is unfortunate.

In my prior patent application No. 552,607, now Patent 2,965,141, I have proposed to fill the freezing cells by means of dispensing pumps each of which consists of a weight loaded piston vertically movable in a transverse bore in a cylindrical drum extending horizontally over a row of freezing cells, said drum being displaced up and down by suitable means. In this apparatus the delivery rate of the pump is substantially proportional to the upward velocity of the filling unit which for one thing involves that the delivery of material cannot start until the filling unit starts its upward motion which as explained above may be unfavourable for the use of a highly pre-frozen material.

It is an object of the present invention to provide a solution to the problems outlined above, and to provide a filling apparatus which will work reliably with even strongly pre-frozen materials, and which may readily be adjusted to operate in connection with freezing cells of varying dimensions and shapes.

According to the invention a filling apparatus of the kind referred to comprises a positive displacement pump associated with each filling tube, an inlet duct for said pumps, a drive shaft common to said pumps, drive means for said drive shaft comprising a releasable clutch, and means for engaging and disengaging said clutch in timed relationship with the movement of said filling unit.

The term "positive displacement pump" is understood as comprising any pump in which the transport of material from the inlet of the pump to the outlet thereof occurs as a direct positive effect caused by the displacement of one or more displacement members and which under constant operation conditions yields a substantially constant volume of material per unit of time.

By the use of positive displacement pumps for forcing the cream through the filling tubes into the freezing cells the result is attained that the discharge and hence the filling of the cells occur at a uniform rate during the upward motion of the filling unit, so that in a simple way—e.g. by adopting the vertical velocity of the filling unit to a variable cross section area in the freezing cell— it is possible to maintain a constant difference of height between the mouth of the filling tube and the level of the cream already poured into the freezing cell.

The releasable clutch in the drive means for the common drive shaft of the pumps enables the pumping action to be commenced before the filling unit starts its upward motion so that the above-mentioned initial resistance against the filling may have been overcome at the moment when the filling tubes start their upward motion. Thus the freezing cell becomes completely filled with cream and the said constriction at the end of the ice-cream brick is avoided.

According to the invention it is preferred that the moment for the engagement of the releasable clutch is adjustable. Hereby it is made possible during the operation of the apparatus to compensate for variations, if any, in the consistency, the degree of freezing or other qualities of the material which may necessitate a change of the moment at which the pumping action should be started. Preferably also the moment for the disengagement of the releasable clutch is adjustable. Hereby an adjustment of the quantity of material supplied to the freezing cells is made possible, if desired during operation of the apparatus.

Further objects and features of the invention will be apparent from the following description in which reference is had to the accompanying drawings where:

FIG. 1 diagrammatically shows a plan view of a stepwise rotatable ice-cream brick refrigerator provided with a filling apparatus according to the invention, FIG. 2 an elevation of the refrigerator, partly in section along line II—II of FIG. 1, FIG. 3 a vertical section taken on line III—III of FIG. 1, FIG. 4 a horizontal section taken on line IV—IV of FIG. 3, FIG. 5 a vertical section taken on line V—V of FIG. 3, FIG. 6 a section taken on line VI—VI of FIG. 5, FIG. 7 a vertical section taken on line VII—VII of FIG. 1, showing in detail an upper part of the filling unit, FIG. 8 a section also taken on line VII—VII of FIG. 1 but showing a lower portion of the filling unit, FIG. 9 a section taken on line IX—IX of FIG. 8, FIG. 10 a section taken on line X—X of FIG. 8, FIG. 11 a vertical sectional corresponding to FIG. 3, but showing a modified embodiment of the invention, FIG. 12 an elevation of electric switch means for the filling apparatus of the invention, FIG. 13 a section taken on line XIII—XIII of FIG. 12.

Figure 1:
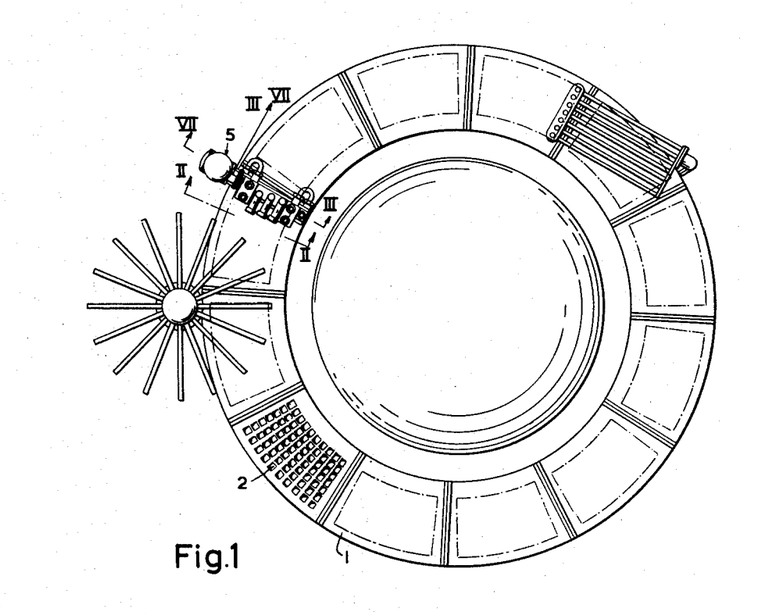
Figure 2:
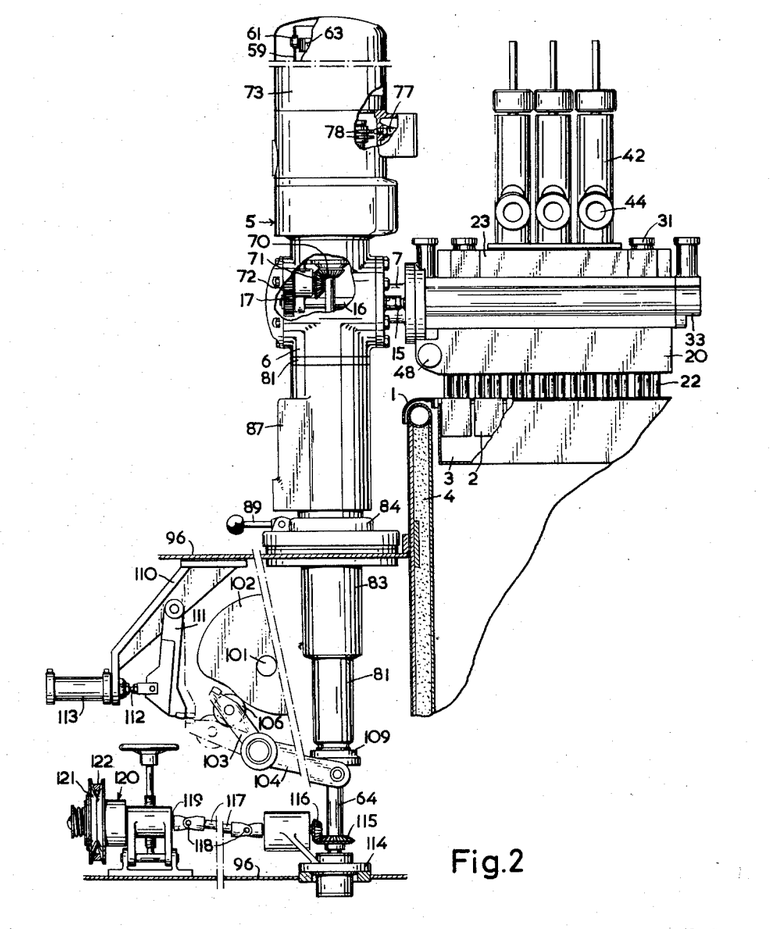

In FIGS. 1 and 2 there is shown a rotary ice-cream brick refrigerator which may be of the type described in my Patent No. 2,791,890, comprising an annular table 1 in which a number of mould sectors are secured, each of which contains a number of freezing cells 2 arranged in radial rows and in concentric rings in relation to the center of the table 1. The table 1 is rotatable about a vertical axis through the center thereof, and during the operation of the refrigerator the table is rotated stepwise corresponding to the angular distance between successive rows of freezing cells 2 whereby the cells successively pass a filling apparatus generally designated by 5, which fills a predetermined amount of material into each cell, a stick fitting device which mechanically inserts sticks into the material in the cells, and a picking-up apparatus for removing the frozen ice-cream bricks. The rotatable table 1 is journaled in and supported by a stationary framework or support, not shown, to which also the accessories mentioned above are secured.

Below the table 1 an annular tank 3 is provided which contains a freezing bath and a thrawing bath through which the freezing cells 2 will successively pass during the rotation of the table. The tank 3 is surrounded by a heat insulating wall 4 which forms part of the above mentioned stationary portion of the refrigerator.

Figure 3:
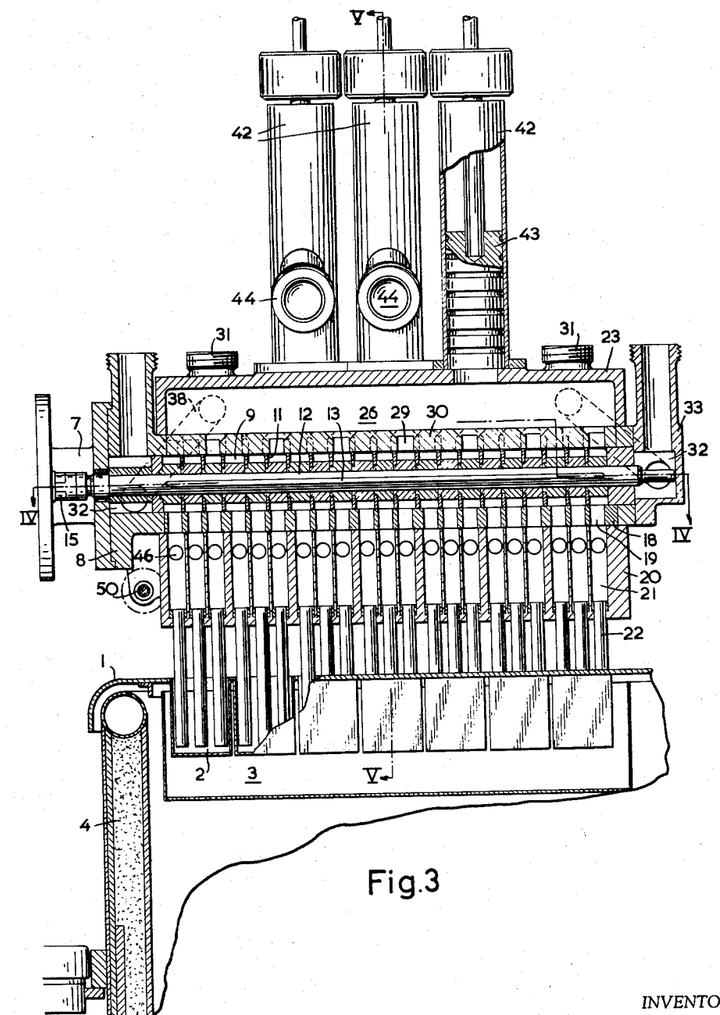
Figure 4:
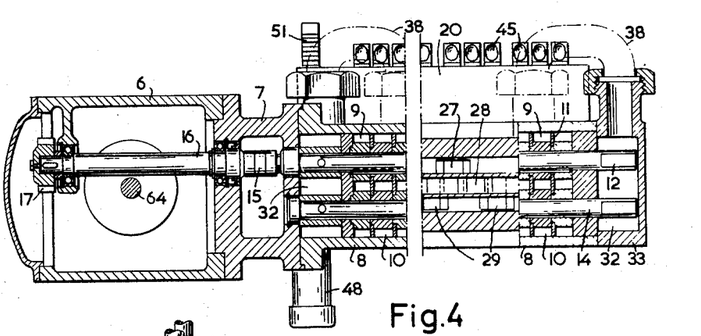

The filling apparatus 5 according to the invention which is shown in greater details in FIGS. 3-10, comprises a stationary portion secured to the framework of the refrigerator and a vertically movable filling unit guided by said stationary portion. The filling unit comprises a vertical hollow cylindrical column 81, FIGS. 7 and 8, to the upper side of which a gear box 6 is bolted. To the side of the gear box 6 an intermediate part 7, FIGS. 3 and 4, is secured which carries a horizontally extending pump casing 8. The pump casing extends across a radial row of freezing cells 2 and contains a number of identical gear pumps, in the embodiment shown in FIGS. 3 and 4 there are three pumps for each freezing cell in said row of cells.

Each gear pump consists of two pump gear wheels 9 and 10, and spacers 11 fill the interspaces in the pump casing between the gear pumps. All the pump gear wheels 9 are mounted on a common shaft 12 and are driven by said shaft by means of a key 13. The pump gear wheels 10 are mounted so as to be freely rotatable on a shaft 14. At their ends adjacent the stationary part of the filling apparatus the shafts 12 and 14 are journalled in the intermediate part 7, and the shaft 12 is provided with a projecting end which through a claw clutch 15 is connected to a shaft 16 which from the gear box 6 projects into the intermediate part 7.

To the end of the shaft 16 located opposite to the claw clutch 15 a gear wheel 17 is secured which meshes with a gear wheel 72, FIG. 7, which through a releasable clutch to be described later on is in driving connection with the input shaft of the filling apparatus, said input shaft being driven from the same motor as the main shaft of the refrigerator.

As mentioned above the pump casing 8 contains three gear pumps 9, 10 for each freezing cell 2, the filling apparatus shown being intended for the filling of three different kinds of material, e.g. ice-cream of three different colours, into each freezing cell. In the lower part of the pump casing 8 there is fitted an elongated filler block 18 having a number of openings 19, one for each gear pump. The filler block is supported by a bottom part 20 which is bolted to the pump casing and in which a number of vertical channels 21 are provided, one in line with each opening 19. A downwardly extending filling tube 22 is telescopically displaceable in each vertical channel 21, and as there are three gear pumps 9, 10 for each freezing cell 2 there are also three filling tubes 22 which in the position of the filling unit shown in FIG. 3 project into each freezing cell 2. The telescopical mobility of the filling tubes 22 prevents breakdown of the apparatus if inadvertently an ice-cream brick should happen to be present in one of the freezing cells 2 located under the filling unit in order to be filled.

To the upper side of the pump casing 8 a top part 23 is secured containing three mutually separated chambers 24, 25 and 26 extending longitudinally through the top part. To each of the chambers 24, 25 and 26 one of the three different materials is supplied which by means of the pumps 9, 10 are filled into the freezing cells 2. The communication between the three chambers and the gear pumps is provided by means of openings 27, 28 and 29 in an elongated filler block 30 fitted into the upper side of the pump casing 8 between the top part 23 and gear pumps. As will be seen from FIG. 4 the openings 27, 28 and 29 are so staggered in relation to each other that the openings 27 establish a communication from the chamber 24 to every third gear pump 9, 10 while the openings 28 and 29 in similar way establish communication from the chambers 25 and 26, respectively, to the remaining pumps 9, 10, so that three different kinds of material are supplied to the three filling tubes 22 in each freezing cell 2 when the gear pumps rotate.

Figure 5:
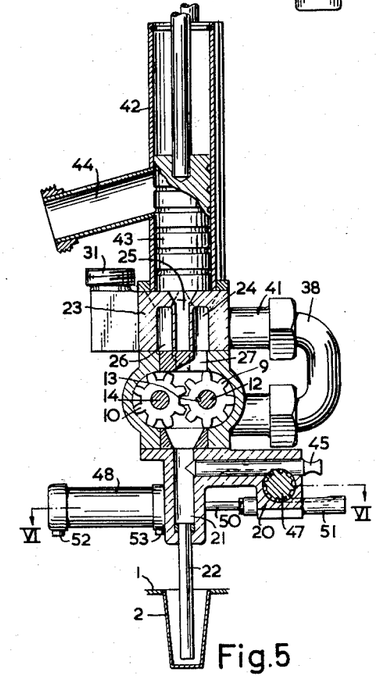
Figure 6:
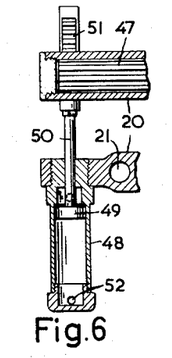

On its upper side the top part 23 carries four threaded branches 31 of which the two seen in FIG. 3 communicate with the central chamber 25 of the top part while the two branches shown in FIG. 5 communicate with the chamber 26. These branches serve for fastening supply tubes for two of the three materials which are preferably supplied in a pre-frozen state by continuous freezers while the material supplied to the chamber 24 is delivered to two cooling chambers 32 located at each end of the pump casing 8, in the pump casing proper and in a separate end part 33 bolted to the pump casing 8, respectively. From the cooling chambers 32 the material passes through two U-shaped pipes 38 to horizontally extending branches 41 on the top part 23, the bores of said branches communicating with the chamber 24. The importance of the cooling chambers 32 for the operation of the filling apparatus is described in detail in my co-pending patent application No. 831,413, now Patent No. 3,035,417.

On the upper side of the top part 23 there are furthermore mounted three cylinders 42 each of which communicates with one of the chambers 24, 25 and 26. Each cylinder 42 contains a weight-loaded piston 43 which serves as an overflow valve for one chamber so that excess material can flow out through an overflow pipe 44 when the piston 43 is raised a certain distance. The pistons 43 will keep the materials in the chambers at a certain pressure which ensures an even and uniform supply of material through the entire number of pumps 9, 10. Furthermore the pistons 43 provide an equalization of the periodical variations in the volume of the material present in the distribution chambers, which will appear when—as explained above—the materials are supplied at a substantially constant rate, e.g. from continuous freezers, while on the other hand the discharge of material by way of the pumps occurs intermittently in discrete portions. Owing to the presence of the overflow pipes 44 it is possible to adjust the supply of material so that it is slightly greater than the amount of material discharged by the pumps. Hereby it is ensured that each distribution chamber is always completely filled with material so that the risk of getting occlusions of air in the material discharged into the freezing cells is out of the question.

The use of materials pre-frozen to a high degree, which is made possible by the provision of positive displacement pumps according to the invention, may give rise to a difficulty in connection with the end of the pumping action. It has turned out that the material present under the mouths of the filling tubes may be constricted in the shape of an hour-glass before the coherence between this material and the material in the freezing cells is interrupted during the continued upward motion of the filling unit. When the material is highly frozen and consequently rather stiff at the filling moment the frozen confections will have an outwardly tapering end surface which obviously is undesirable. According to the present invention this inconvenience may be avoided by providing the filling apparatus with a retractive-suction device as shown in FIGS. 3–6 and explained below.

This retractive-suction device comprises for each filling tube 22 a plunger 45 which is reciprocating in a horizontal, cylindrical bore 46 provided in the bottom part 20 and opening into the upper part of the vertical channel 21. The underside of the plunger 45 is shaped as a rack, and the racks of all plungers 45 mesh with a toothed shaft 47 which is rotatably supported in the bottom part 20. To the bottom part there is secured a horizontal pneumatic cylinder 48 having a piston 49 the piston rod 50 of which is secured to a rack 51 which is reciprocally supported in a bore in the bottom part 20 parallel to the plungers 45 and meshing with the toothed shaft 47. At each end of the cylinder 48 there is an inlet 52 and 53 respectively, which by means of a control mechanism to be described later on can be connected to a supply pipe for pressurized air and an exhaust pipe respectively. When pressurized air is supplied to one end of the cylinder 48 the piston 49 will be displaced toward the opposite end of the cylinder, and by way of the rack 51 and the toothed shaft 47 it will displace all retractive-suction plungers 45 either toward the channels 21 or away therefrom.

Figures 7, 9, 10:
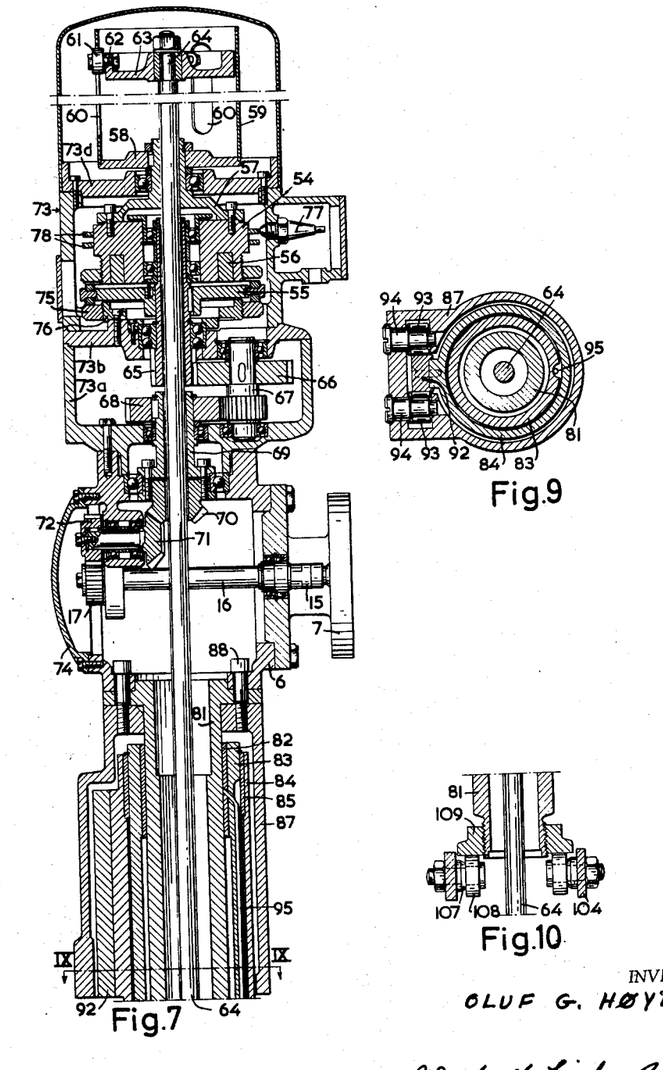

Referring to FIG. 7 the drive means for intermittently driving the gear pumps 9, 10 of the filling apparatus comprises an electro-magnetic releasable clutch having an upper clutch part 54 and a lower clutch part 55 which is axially displaceable with respect to the clutch part 54. When the coil 56 embedded within the clutch part 54 is energized the clutch part 55 will be attracted and will rotate together with the clutch part 54. By way of an intermediate part 57 which is journalled in a disk shaped part 73d of the clutch housing 73 the clutch member 54 is connected to a disk 58 which is secured to a thin-walled tubular driving member 59 of relatively large diameter. The wall of the tube 59 is provided with three longitudinally extending slots 60 spaced 120° apart. A ball bearing 61 fits snugly in each slot 60, and the ball bearings 61 are journalled upon studs 62 carried by a driver plate 63 secured to a vertical drive shaft 64. The drive shaft 64 extends vertically to the bottom of the filling apparatus where it is journalled in a stationary part of the refrigerator and operatively connected to the driving motor of said refrigerator as will be explained later on.

The length of the slots 60 is such as to permit a vertical movement of the filling unit comprising the housing 73 of the releasable clutch and the pump casing 8 from the lowermost position thereof illustrated in FIG. 3 in which the filling tubes 22 extend almost to the bottom of the freezing cells 2, to a position in which the lower ends of said filling tubes 22 are lifted clear of the table 1 so that the latter may rotate freely below the filling tubes to bring a new radial row of freezing cells 2 into position under the filling unit.

The clutch part 55 is rotatively connected to a tubular gear wheel 65, but is axially slidable with respect thereto. The gear wheel 65 is supported and located axially in a disk shaped portion 73b of the housing 73 mentioned above. The clutch part 54 is journalled upon the upper end of the gear wheel 65 through two ball bearings which also locate the clutch part axially with respect to the gear wheel 65 and thus to the housing 73. The gear wheel 65 meshes with a gear wheel 66 secured to a pinion shaft 67 which is journalled in the lower part 73a of the housing 73 and meshing with a gear wheel 68 secured by way of an intermediate hollow shaft 69 to a bevel gear 70 journalled in the gear box 6 of the filling unit. The bevel gear 70 meshes with a horizontally arranged bevel bear 71 which is journalled in the vertical outer wall of the gear box 7, and which carries a spur gear 72 which meshes with the spur gear 17 secured to the shaft 16 mentioned above. After removal of a detachable cover 74 the gear wheels 72 and 17 are readily accessible so that they may be removed and interchanged with other gear wheels providing a different gear ratio and consequently a different speed of rotation for the pump wheels 9 and 10.

The electro-magnetic clutch further comprises a brake ring 75 adjustably secured to a ring 76 secured to the portion 73b of the clutch housing 73. Two sliding contacts 77 of which only one is shown in FIG. 7 are arranged for contact with the slip rings 78 of the clutch.

An electrical control circuit which will be described later permits supply of current to the sliding contacts 77 to energize the coil 56 of the clutch so that the clutch member 55 is attracted by clutch member 54 whereby a driving connection is established from the vertical driveshaft 64 through the clutch and the gearing described above to the shaft 16 and thus to the gear pumps 9, 10. The clutch part 55 is spring-loaded so that when the current is interrupted it is biased in part by the spring and in part by its weight to engage the brake ring 75 thereby stopping the gear pumps 9, 10 substantially instantaneously.

Thus it will be seen that as long as the coil 56 of the clutch is energized the gear pumps will rotate at a constant speed thereby forcing material supplied to the distribution chambers 24, 25 and 26 through the filling tubes 22 into the freezing cells 2, and as soon as the current is cut off from the coil the pumps will stop and the delivery of material will be interrupted.

Figure 8:
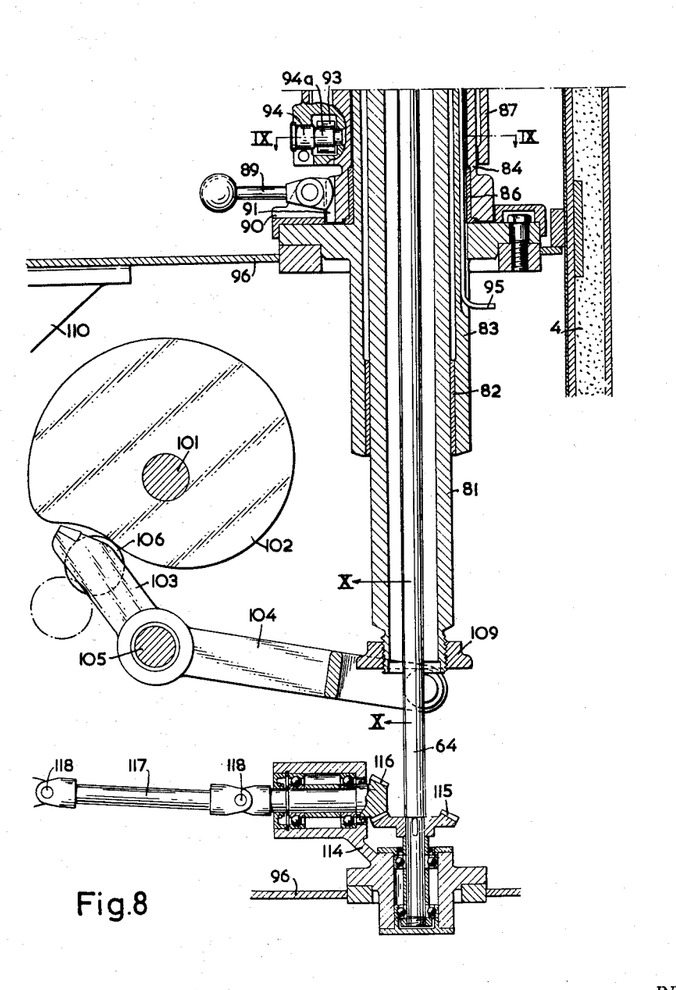

The vertical column 81 of the filling unit is guided by two liners 82 fitted in a vertical stationary guide 83 secured to the framework 96 of the filling apparatus which in turn is secured to the stationary portion of the refrigerator. A further tubular guide member 84 is rotatably guided around the guide member 83 through two liners 85 and 86. Finally an outer cover 87 which is substantially tubular is secured to the inner column 81 by means of screws 88 interconnecting the column 81, the gear box 6 and the cover 87. As mentioned the guide member 84 is rotatably adjustable but may be locked in a certain angular position by means of a locking lever 89 pivotally carried by a bracket 90 secured by bolts to the framework 96 of the filling apparatus. As shown in FIG. 8 the lever 89 may engage a vertical slot 91 in the bottom flange of guide member 84. A vertically extending key 92 is secured to the side of the guide member 84, and two mutually parallel bolts 94 which are journalled in the outer cover 87, FIGS. 8 and 9, carry needle bearings 93, the outer races of which are in contact with the lateral faces of the key 92. Thus the key and the needle bearings act as lateral guide means for the cover 87 and thus for the entire filling unit in relation to the stationary guide 84 and thereby to the refrigerator.

The journal parts 94a of the bolts 94 which carry the needle bearings 93 are slightly eccentric in relation to those parts of the bolts which are journalled in the cover 87. By a suitable rotative adjustment of the bolts 94 it is thus possible for one thing to attain a desired minimum value of the play between the key 92 and the needle bearings 93, and furthermore to attain an accurate adjustment of the position of the filling unit in the horizontal plane in such a way that the filling tubes 22 are disposed exactly above a row of freezing cells 2 with which they are to cooperate. Besides this fine adjustment a coarse adjustment may be obtained by letting the screws which clamp the bracket 90 to the frame-work 96 of the filling apparatus pass through the elongated slots in the bracket 90 so that this bracket may be adjusted angularly about the vertical axis of the tubular members 81, 83 and 84.

An oil supply tube 95, FIG. 8, extends upwardly in a groove in the guide member 83 to a circumferential groove in the upper liner 82. Through the tube 95 oil can be supplied to lubricate the column 81, and excess oil will in part flow over to the outer surface of the guide member 83 to lubricate the liners 85 and 86, and in part run down along the column 81 to lubricate the lower liner 82.

The vertical motion of the filling unit described is derived from a shaft 101, FIG. 8, which preferably is driven from the same electric motor as the refrigerator by a connection which is not shown. The shaft 101 carries a suitably shaped cam 102. A double-armed lever 103, 104 is journalled upon a shaft 105 lying below the shaft 101. At its free end the lever arm 103 carries a rotatable roller 106 which is in contact with the periphery of the cam 102. At its free end the other lever arm 104 is shaped as a fork surrounding the lower end of the column 81 and the drive shaft 64 extending therethrough. Each forked arm of the lever 104 is provided with a horizontal stud 107 carrying a ball bearing 108. A ring 109 is screwed upon the lower end of the column 81 and is shaped so as to contact the outer races of the ball bearings 108. Thus the weight of the vertically movable unit is transmitted through the ring 109 the lever 103, 104 thereby maintaining contact between the cam 102 and the roller 106. During one revolution of the shaft 101 the filling unit comprising the gear pumps 9, 10 and the filling tubes 22 thus performs an upward and downward motion during which a radial row of freezing cells 2 are filled with pre-frozen raw material.

The contour of cam 102 is shaped so that from the bottom position shown in the drawings the filling unit will move upwards at a suitable chosen velocity until it reaches the top-position, in which the mouths of the filling tubes are clear of the freezing cells. Thereupon the filling unit will remain stationary in its top-position for a period sufficient to allow the rotary table of the refrigerator to perform one step forwards into the position in which the next radial row of freezing cells 2 is alined with and located beneath the filling tubes 22. Next the filling unit will move at a considerably higher velocity downwards to its bottom-position from which without any substantial dwelling time it will start a new upward motion during which the next row of freezing cells will be filled with material delivered by the pumps.

During the rotation of the gear pumps they will supply a substantially constant quantity of material per unit of time, and it will therefore be appreciated that by adapting the contour of cam 102 which determines the velocity of travel of the filling unit, it is possible in a simple way to insure that each freezing cell is filled in time with the upward motion of the filling tube so that during the filling a substantially constant difference may be maintained between the level of material already filled into the freezing cell and the mouth of the filling tube. If the freezing cell, and thus the ice cream brick to be produced, is of prismatic shape cam 102 is given a contour which provides a substantially constant velocity in the upward motion of the filling unit. If, however, an ice-cream brick of a tapering, e.g. frusto-pyramidical shape is to be produced, the contour of cam 102 will be designed so that the vertical velocity of the filling unit will decrease in inverse proportion to the upwardly increasing cross section area of the freezing cell. The regular filling attained hereby is of great importance for the quality of the ice-cream bricks produced.

To the stationary portion of framework 96 of the filling apparatus there is secured a depending bracket 110 to which a depending arm 111 is pivoted. Arm 111 is pivotally connected to the piston rod 112 of a pneumatic jack 113 which is secured to bracket 110, the arrangement being such that in the retracted position of piston rod 112 and arm 111 shown in full lines in FIG. 8 the arm 111 will be clear of the lever arm 103, while in the advanced position shown in dot-and-dash lines the end of arm 111 engages arm 103 when said arm is in its lowermost position, i.e. when roller 106 engages the portion of cam 102 having the maximum diameter. Thus when the piston of jack 113 is advanced by means which will be described later on lever 103 will be locked by arm 111, and the filling unit will be held in its elevated position in which, the entire movable part of the filling apparatus comprising the pump casing 8 with the filling tubes 22, the clutch housing 73 and the tubular members 81, 84 and 87, when lever 89 shown in FIG. 7 is pivoted to vertical position thereby releasing guide member 84, may be swiveled about the vertical axis of the stationary guide member 83, thereby permitting cleaning and servicing operations to be carried out on the filling unit.

As previously mentioned drive shaft 64 of the filling unit extends vertically to the bottom part of the filling apparatus, and as shown in FIG. 8 it is here journalled in two ball bearings located in a bearing housing 114 secured to the framework 96 of the filling apparatus. A bevel gear 115 is keyed to shaft 64 and meshes with a horizontally extending bevel gear 116 having a shaft extension which is journalled in the housing 114, and which by way of a telescopic shaft 117 and two universal joints 118 are drivingly connected to output shaft 119 of a variable gear 120. The gear 120 which may be of any suited type is only shown diagrammatically as being of the infinitely variable type comprising a two-piece pulley 121 driven through a belt 122 from a suitable driving means, preferably the drive motor of the ice-cream brick refrigerator. It will be appreciated that by varying the gear ratio of gear 120 the rotation speed of gear pumps 9, 10 and thereby the discharge rate of material therefrom is correspondingly varied. With unaltered timing of the beginning and the termination of the pumping action the amount of material delivered into each freezing cell is thus altered accordingly.

Figure 11:
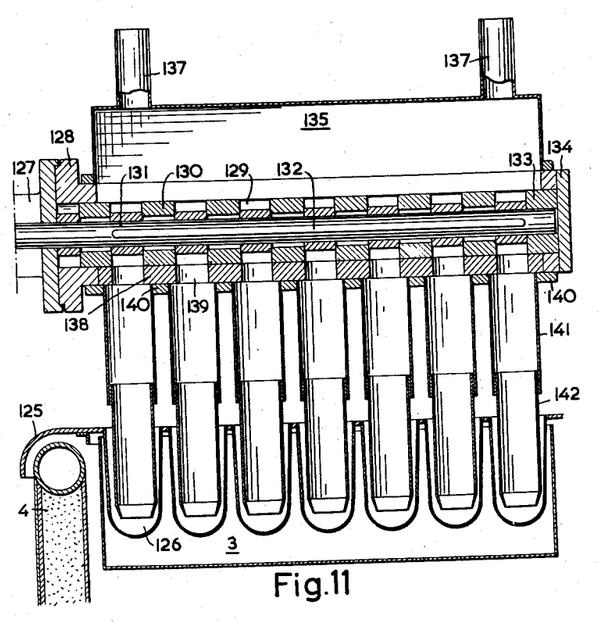

A modified embodiment of the invention is shown in FIG. 11 which is a section corresponding to FIG. 3 in a filling apparatus applicable in connection with freezing moulds the cells of which are to be filled with one kind of material only. The parts of the filling apparatus not shown in FIG. 11 may be exactly or substantially the same as those described above and shown in FIGS. 2–10. While the embodiment shown in FIG. 11 is illustrated without some features, such as the retractive-suction devices and the end cooling chambers described above, it is to be understood that these features may also, if desired, be employed in connection herewith, suitably modified.

In FIG. 11 there is shown the table 125 of a stepwise rotatable ice-cream brick refrigerator comprising depending freezing cells 126 corresponding to the freezing cells 2 of the first embodiment, but differently shaped. The tank 3 which surrounds the freezing cells 126, and the insulating wall 4 surrounding the tank are identical with those previously described. A pump casing 128 extends horizontally over a radial row of freezing cells 126, and the pump casing is secured to an intermediate part 127 corresponding to part 7, FIGS. 2 and 4, which is bolted to the vertically movable part of the filling unit not shown.

The pump casing 128 contains a number of filling pumps, one for each freezing cell 126 in the radial row, each pump comprising two identical gear wheels 129 of which only one is shown for each pump. Spacers 130 fill out the interspaces between the gear pumps, and the gear wheels 129 shown are drivingly connected to a drive shaft 131 that extends to the left out of the pump casing 128 where it may be connected to the drive shaft 16 shown in FIG. 7 by means similar to the coupling 15 shown in this FIGURE. The opposite end of the shaft 131 as well as the corresponding end of the shaft not shown for the cooperating gear wheels are journalled in a bearing block 133 made of poorly heat-conductive material. An end cover 134 locates the pump unit consisting of the pump wheels 129 and the spacers 130 in the axial direction.

A closed distribution chamber 135 is mounted upon the top of the pump casing 128 and communicates with the upper inlet side of the gear pumps through an opening 136 in the top of the gear casing. On its upper side the distribution chamber 135 carries two branches 137 which may be connected to supply pipes or hoses leading from a freezer for supplying pre-frozen material to the filling unit. In the lower side of the pump casing there is fitted a filler block 138 having a number of openings 139, one for each gear pump. The filler block 138 is supported by a bottom part 140 bolted to the pump casing and carrying filling tubes 141, one for each gear pump. In the lower end of each filling tube 141 a telescopically displaceable filling tube nozzle 142 is inserted.

Figure 12:
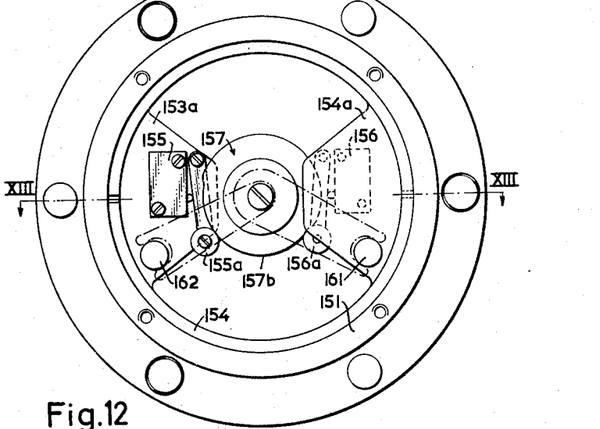
Figure 13:
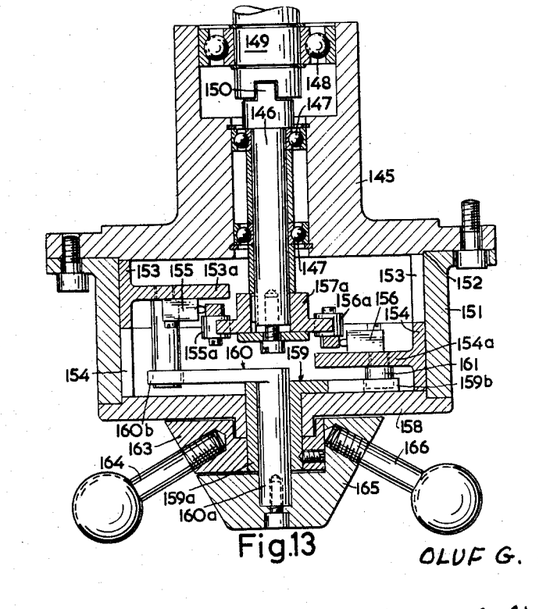

The moments of engagement and disengagement of the electromagnetic clutch shown in FIG. 7 are controlled by switch unit shown in FIGS. 12 and 13. A back plate 145 which is secured to the stationary portion of the refrigerator or the filling apparatus serves as a support for a shaft 146 journalled in ball bearings 147. A shaft end 149 journalled in a ball bearing 148 in the back plate 145 is rotatively connected with the rear end of the shaft 146 by means of a claw clutch 150. The shaft end 149 may either be the end of the main shaft of the refrigerator or a shaft rotating synchronously with this main shaft.

A casing 151 having a cylindrical bore is bolted to the back plate 145 and is located in relation thereto by an annular edge 152. Inside the casing 151 two ring shaped switch carriers 153 and 154 are guided by the bore of the casing. The switch carrier 153 comprises a plate 153a directed towards the center, and a micro-switch 155 secured to the plate 153a and provided with an actuating roller 155a. Similarly the switch carrier 154 comprises a part 154a which carries a micro-switch 156 having a roller 156a. The plates 153a and 154a as well as the micro-switches 155 and 156 are mounted so that the rollers 155a and 156a lie substantially in the same plane perpendicular to the axis of the casing 151.

The front end of the shaft 146 carries a cam 157 having a boss 157a and a cam surface 157b lying in the same plane as the rollers 155a and 156a of the micro-switches 155 and 156. The cam surface 157b consists of two concentric circular arcs of different radii chosen so that any of the switches 155, 156 is interrupted when its roller 155a, 156a is in contact with the part of the cam surface 157b having the smallest radius while the switch is closed when the roller is in contact with the part of the cam surface 157b having the largest radius.

To the end surface of the casing 151 opposite the back plate 145 a front cover 158 having a central bore is screwed. In the central bore a guiding arm 159 comprising a hollow boss 159a and an arm 159b perpendicular thereto is journalled. Inside the hollow boss 159a another guiding arm 160 is journalled, said latter arm comprising a cylindrical part 160a and an arm 160b perpendicular thereto. At its outer end the arm 159b is provided with a radial slot encompassing a cylindrical pin 161 secured to the plate 154. Similarly the arm 160b is provided with a radial slot encompassing a cylindrical pin 162 secured to the plate 153a.

Externally of the front cover 158 the boss 159a carries a boss 163 into which a handle 164 is screwed, while the shaft 160a carries a boss 165 provided with a handle 166. By means of the handles 164 and 166 the pins 162 and 161 may be displaced manually whereby the micro-switches 155 and 156 are displaced angularly about the axis of the switch unit.

Figure 14:
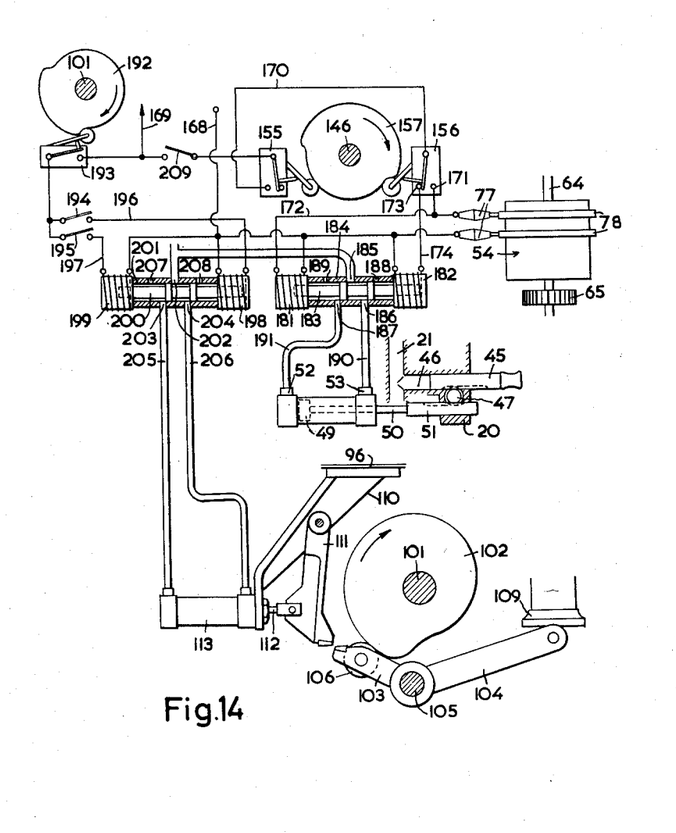
FIG. 14 a diagram of the electric control circuit for the apparatus.

The micro-switches 155 and 156 are series-connected in the electric control circuit of the filling apparatus shown diagrammatically in FIG. 14. A voltage source not shown is connected to the main supply lines 168 and 169 of the circuit. Line 169 is connected to the input terminal of micro-switch 155 and the output terminal of said micro-switch is through line 170 connected to the input terminal of micro-switch 156. The micro-switch 156 has two output terminals 171 and 173 of which terminal 171 is electrically connected to the input terminal of the micro-switch in the "closed" position thereof described above, i.e. when the actuating roller 156a is in contact with the larger radius of the cam 157, FIG. 12. The other terminal 173 is connected to the input terminal of micro-switch 156 in the "open" position of the micro-switch. Terminal 171 is connected through a line 172 to a coil 181 of a control valve 183, 184 for the retractive-suction device previously described. Terminal 173 is connected through a line 174 to a coil 182 of the control valve 183, 184. Both coils 181 and 182 are connected to supply line 168.

The output terminal 171 of micro-switch 156 is furthermore connected to one of the sliding contacts 78 of the electromagnetic clutch previously described with reference to FIG. 7 while the other sliding contact 78 is connected to supply line 168.

The control valve 183, 184 comprises a spool valve member 183 axially displaceable in the valve cylinder 184 which is provided with a central inlet port 185 for pressurized air, two axially spaced outlet ports 186 and 187 leading through pipings 190 and 191 respectively to either end 53 and 52 respectively of the cylinder 48 of the retroactive-suction device. The valve cylinder 184 is further provided with two exhaust ports 188 and 189 located further away from the central inlet port 185 than the outlet ports 186 and 187. The spool valve member 183 is provided with two lands which are spaced so that in each of the two operative positions of the valve member—which are determined by either of the coils 181 and 182 being energized—the inlet port 185 communicates with either of the outlet ports 186 and 187 while the other outlet port communicates with one of the exhaust ports 188 and 189.

The control circuit further comprises a circuit parallel to that just described, comprising a micro-switch 193 the input terminal of which is connected to line 169 while the output terminal thereof is connected through lines 196 and 197 to coils 198 and 199 of a control valve 200, 201 corresponding to the valve 183, 184 just described. A manually operable switch 194 lies in line 196 while a similar manually operable switch 195 lies in line 197. A cam 192 secured to the shaft 101 previously described is arranged for actuating the micro-switch 193 so as to alternately close and open said switch once during each revolution of the shaft 101. The shape of the cam 192 and the purpose thereof will be explained more in detail below.

The control valve 200, 201 comprises a spool-type valve member 200 and a valve housing 201 which is provided with a central inlet port 202 for pressurized air preferably from the same source as the air delivered to the inlet port 185 of the control valve 183, 184 described above. Furthermore the valve housing 201 is provided with two axially spaced outlet ports 203 and 204 and two exhaust ports 207 and 208 spaced axially a greater distance from the central inlet port 202 than the outlet ports 203 and 204. Outlet port 203 communicates through piping 205 with one end of the cylinder of the pneumatic jack 113, while outlet port 204, communicates through a similar piping 206 with the opposite end of said cylinder.

In the position of the control circuit elements shown in FIG. 14 switch 155 is open so that both the electromagnetic clutch 54 and the coils 181 and 182 of the retractive-suction device are de-energized. Retractive-suction plungers 45 are in their retracted position. Switch 193 is open, and the vertically movable filling unit is in its elevated position due to the roller 106 engaging the major diameter of cam 102. As previously mentioned shafts 101 and 146 rotate synchronously in a clockwise direction as shown by the arrows. After a moment the filling unit starts its downward motion during which the filling tubes enter the freezing cells of the refrigerator, and simultaneously the micro-switch 156 is shifted so that line 170 is connected to line 172 through terminal 171. No current will flow in the circuit however as switch 155 is still open. Shortly before the filling unit has reaced its lowermost position cam 157 closes switch 155 whereby current flows through lines 170 and 172 to the electromagnetic clutch 54 and coil 181 respectively. Energizing of the clutch 54 starts the gear pumps which deliver material through the filling tubes into the row of freezing cells in which said filling tubes are located. Simultaneously with the engagement of the clutch 54 the energizing of coil 181 will cause valve member 183 to be displaced to its extreme left hand position in which it provides communication from air inlet port 185 through pipe 191 to branch 52 at the left hand end of cylinder 48. Thereby piston 49 will be displaced to its right hand extreme position, and the plungers 45 will be advanced towards the passages 21 by means of rack 51 and the intermediate, toothed shaft 47. Hereby plungers 45 will cooperate to augment the pressure of the material delivered by the gear pumps and overcome the resistance which opposes the discharge of said material through the channels 21.

The clutch 54 will remain energized as long as the rollers of both switches 155 and 156 are in contact with the greater diameter of cam 157, and during this period of pumping the filling unit will move upwards at an appropriate rate determined by the contour of the ascending part of cam 102 which cooperates with roller 106.

After a further rotational movement of shafts 101 and 146 switch 156 is shifted from terminal 171 to terminal 173 thereby de-energizing clutch 54 and coil 181 and energizing coil 182 through line 174. Hereby the pumping action of the gear pumps is interrupted momentarily due to the brake mechanism associated with clutch 54, and valve member 183 is shifted to the position shown in FIG. 14. Pressurized air entering the valve 183, 184 through inlet port 185 now passes through pipe 190 to the branch 53 of cylinder 48. Thus the piston 49 is displaced towards its left hand extreme position and plungers 45 are retracted towards the right. Hereby material which is present in the channels 21 will be submitted to a suction which ensures an exact cutting-off of the discharge of material to the freeezing cells, effectively counter-acting delayed dripping of material during the following period in which the pumps are not rotating. During this period the filling unit remains in its elevated position, the roller 106 riding on the greater diameter of cam 102, and during this period the table of the ice-cream brick refrigerator is rotated one step forwards so as to bring a new row of freezing cells in position below the filling tubes of the filling unit. During this period switch 155 will open, but it will be appreciated that this has no influence upon the clutch 54 or the retractive-suction devices which remain in the position shown in FIG. 14.

During the rotation of shafts 101 and 146 as described above cam 192 will close and re-open switch 193 once. As the manually operable switches 194 and 195 are both open under normal operation of the apparatus no current will flow in lines 196 and 197, and valve member 200 will remain in the position shown in FIG. 14. If switch 195 is closed at a moment at which switch 193 is closed by cam 192 the coil 199 will be energized and valve member 200 will be displaced towards the left, thereby establishing communication from air inlet port 202 through outlet port 203 and pipe 205 to the left hand end of the cylinder 113. Hereby the piston associated with said cylinder will be advanced and the arm 111 will be advanced to its operative position in which it engages arm 103 thereby locking the filling unit in its elevated position. Conversely the filling unit may be released from its locked position by closing switch 194 which energizes coil 198 thereby displacing valve member 200 to the position shown in FIG. 14, in which pressurized air is supplied through pipe 206 to the right hand end of cylinder 113 so that the arm 111 is retracted. In order to avoid damage to the apparatus cam 192 is shaped and secured to shaft 101 in such a way that switch 193 is only closed in a period lying entirely within the period in which roller 106 cooperates with the contour part of cam 102 having the greatest diameter. Hereby it is ensured that when arm 111 is advanced to engage arm 103 said latter arm is always in the correct position, and that retraction of arm 111 can only take place when roller 106 is in contact with the contour of cam 102. When the filling unit is locked in its elevated position as just described it may be rotated bodily about its vertical axis as previously described for cleaning and servicing purposes. A manually operable switch 209 in the line leading to switch 155 is preferably opened before switch 195 is actuated so that clutch 54 and the retractive-suction devices are rendered inoperative during the above mentioned operations.

The invention is not limited to the embodiments described hereinbefore and illustrated in the accompanying drawings. While it is important that the retractive-suction devices are always operated substantially at the same moment as the filling pumps stop rotating, it is not necessary that the retractive-suction plungers are advanced exactly at the same time as the beginning of the pumping action. It will however appear from the above that this is advantageous by augmenting the pressure acting on the material at the beginning of the pumping action, and that it provides for a relatively simple control circuit. The filling apparatus described may also comprise more than one filling tube for each gear pump. If for instance the filling apparatus shown in FIGS. 1–10 is changed from delivering three different kinds of material to delivering only one kind of material it might be possible to dismount only the pump wheels and the distribution chambers and replace said parts by pump wheels having a larger width and a single distribution chamber as shown in FIG. 11, thereby leaving the bottom part and the filling tubes in place so that each freezing cell is filled simultaneously through three filling tubes which all deliver from the same gear pump. It is also possible to employ retractive-suction devices which are actuated purely electrically or possibly mechanically. Any suitable positive displacement pump may be used for filling the freezing cells, the main thing being that the commencement and termination of the pumping action can be varied in a simple way by means of a releasable clutch. The possibility of adjusting the moments for the engagement and the disengagement of the clutch eliminates the difficulties encountered at the commencement of the filling so that the freezing cells will become completely filled from the bottom even when a strongly pre-frozen cream is used, and this is of great importance, the production capacity of the refrigerator being considerably increased thereby. By the fine adjustment of the moment of termination of the filling a very accurate adjustment of the quality delivered into each freezing cell is made possible, which obviously is of a great economical importance. As explained a coarser adjustment of the quantity of material delivered by the pumps, e.g. when changing to the production of ice-cream bricks of a different size or a different shape may be effected by means of the variable gear 120 shown in FIG. 8. Such adjustment may furthermore be carried out by exchanging the spur gear wheels 17 and 72 in the drive mechanism for the pump wheels or by exchanging the pump gear wheels proper with other gear wheels having different width. In the latter case it is obviously also necessary to replace the spacers between the pump wheels with other spacers of an appropriate width. The weight of the vertically movable filling unit may be partly balanced, e.g. by means of springs, provided the part of the weight of the filling unit which is transmitted to the cam follower roller 106 is sufficient for maintaining proper contact between said roller and the contour of the cam which serves for lifting and lowering of the filling unit.

Figure 15:
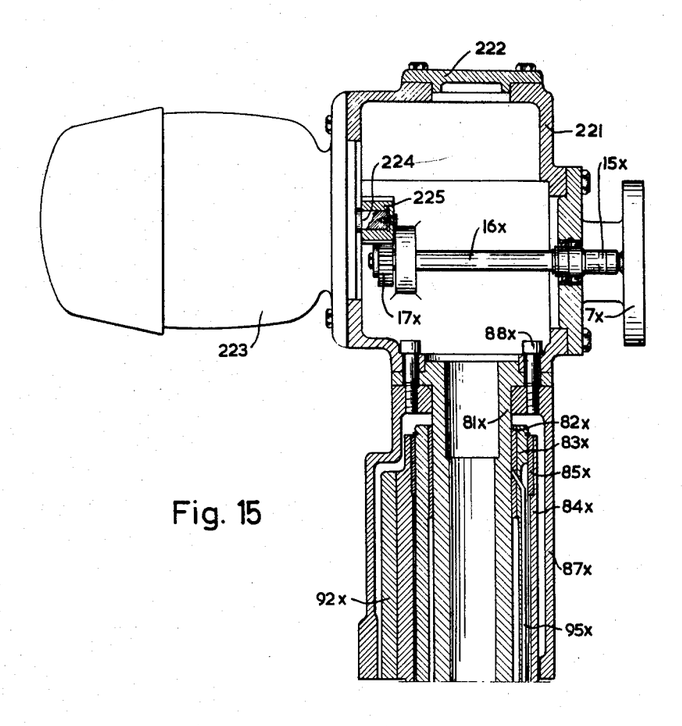
FIG. 15 is a view similar to FIG. 7 showing a detail of a modified form of the upper part of the filling unit.

While the mechanical clutch described above is generally suited when the drive shaft of the pumps is driven by external means, e.g. by the drive motor of the refrigerator, it is alternatively possible to employ a purely electric clutch means by connecting the pump drive shaft to a so-called brake motor the shaft of which will stop substantially instantaneously when the motor current is interrupted. FIG. 15 shows an embodiment corresponding substantially to FIG. 7 but in which such a motor is used. In FIG. 15 the electromagnetic clutch located on top of gear box 6 and the vertical drive shaft 64 is no longer present. The gear box 221 of FIG. 15 is closed at its upper side by a cover 222, and to the left-hand vertical face of the gear box 221 there is bolted a brake motor 223 the shaft 224 of which extends into gear box 221 and carries a gear wheel 225 meshing with gear wheel 17x on shaft 16x. (All parts of FIG. 15 which are identical to those of FIG. 7 have the same reference numeral with an "x" added.)

The brake motor 223 has not been shown in detail as the construction of such a motor is well known. To the rotor shaft of the motor there is secured a braking ring which is spring urged against a stationary braking surface secured to the stator part of the motor. The laminated rotor and stator of the motor are shaped normally as truncated cones, so that the magnetic flux has a component axially of the rotor shaft, which component upon energization of the motor shifts the shaft axially against the spring force so as to release the brake. Upon de-energization of the motor the spring will immediately urge the brake ring secured to the shaft against the stationary braking surface, thereby stopping the motor. Due to the above mentioned axial shifting of the motor shaft 224 between braking and operational positions, the gear wheel 225 is wider than gear wheel 17x, the excess width corresponding substantially to the amount of axial shifting. The switch means described for the control of the clutch may in this case operate the motor current, preferably via suitable relays.

What I claim is:

1. Filling apparatus for an ice-cream brick freezing machine having freezing cells arranged in rows and having drive means for passing said rows under said filling apparatus, said filling apparatus comprising a vertically movable filling unit and means connected to said unit for vertically reciprocating said filling unit and being adapted to be connected to said drive means, a plurality of positive displacement, constant rate filling pumps in said filling unit, one of said pumps for each freezing cell in one of said rows, a plurality of filling tubes, one of said tubes extending from a respective one of said filling pumps towards the corresponding freezing cell, inlet duct means for said pumps, a drive shaft common to all said pumps, a releasable clutch on said drive shaft adapted to be connected to said drive means, and means connected to said clutch and adapted to be connected to said drive means for engaging and disengaging said clutch in timed relationship with the reciprocation of said filling unit.

2. Apparatus as claimed in claim 1 in which said clutch is an electro-magnetic clutch, and said means for engaging and disengaging said clutch comprises rotary cam means, and a current supply circuit connected to said clutch and having two series-connected switches therein, said cam means being engageable with said switches, said switches being angularly adjustable with respect to the axis of said cam means.

3. Filling apparatus for an ice-cream brick freezing machine having freezing cells arranged in rows and having drive means for passing said rows under said filling apparatus, said filling apparatus comprising a vertically movable filling unit and means connected to said unit for vertically reciprocating said filling unit and being adapted to be connected to said drive means, a pump group consisting of at least two positive displacement, constant rate filling pumps in said filling unit for each freezing cell in one of said rows, a plurality of filling tubes, one filling tube extending from a respective one of said filling pumps towards a corresponding freezing cell, separate inlet duct means for each pump in one of said groups, a drive shaft common to all said pumps, a releasable clutch on said drive shaft adapted to be connected to said drive means, and means connected to said clutch and adapted to be connected to said drive means for engaging and disengaging said clutch in timed relationship with the reciprocation of said filling unit.

4. Apparatus as claimed in claim 3 in which said clutch is an electro-magnetic clutch, and said means for engaging and disengaging said clutch comprises rotary cam means, and a current supply circuit connected to said clutch and having two electric switches series-connected therein, said switches being engageable by said cam means for operation thereby, said switches being angularly adjustable with respect to the axis of said cam means.

5. Filling apparatus for an ice-cream brick freezing machine having freezing cells arranged in rows and having drive means for passing said rows under said filling apparatus, said filling apparatus comprising a vertically movable filling unit and means connected to said unit for vertically reciprocating said filling unit and being adapted to be connected to said drive means, a plurality of positive displacement, constant rate filling pumps in said filling unit, a drive shaft common to the plurality of said pumps, a releasable clutch on said drive shaft adapted to be connected to said drive means, means connected to said clutch and adapted to be connected to said drive means for engaging and disengaging said clutch in timed relationship with the reciprocation of said filling pumps, each of said pumps having an outlet passage including a filling tube extending therefrom towards a respective freezing cell, each of said outlet passages having a cylinder communicating therewith, a plunger reciprocable in each of said cylinders, and means connected to each of said plungers for displacing each of said plungers in said cylinders away from said outlet passage simultaneously with the disengagement of said clutch in said drive means.

6. Filling apparatus as claimed in claim 5 in which said means connected to each of said plungers comprises rack teeth on each of said plungers, an elongated gear wheel meshing with each of said plunger racks, an actuating cylinder, a piston in said cylinder having an extension provided with rack teeth meshing with said elongated gear wheel, and means connected to said actuating cylinder for admitting fluid to either side of said piston in said cylinder simultaneously with the engagement and disengagement, respectively, of said clutch in said drive means so as to retract each of said plungers when said clutch is disengaged and to advance each of said plungers when said clutch is engaged.

7. Filling apparatus for an ice-cream brick freezing machine having freezing cells arranged in rows and having drive means for passing said rows under said filling apparatus, said filling apparatus comprising a vertically movable filling unit and means connected to said filling unit for vertically reciprocating said filling unit and being adapted to be connected to said drive means, a plurality of positive displacement, constant rate filling pumps in said filling unit, a filling tube extending from a respective one of said filling pumps, inlet duct means connected to said pumps, a drive shaft common to said plurality of filling pumps, a brake motor mounted on said vertically moveable filling unit and drivingly connected to said drive shaft, and means connected to said brake motor and adapted to be connected to said drive means for energizing and de-energizing said brake motor in timed relationship with the reciprocation of said filling unit.

8. Apparatus as claimed in claim 7 in which said means for energizing and de-energizing said brake motor comprises rotary cam means, a current supply connected to said brake motor, and two electric switches series-connected in said current supply circuit of said brake motor, said switches being engageable for operation by said cam means, said switches being angularly adjustable with respect to the axis of said cam means.

References Cited in the file of this patent

UNITED STATES PATENTS

| | | |
|---|---|---|
| 266,095 | Chewning | Oct. 17, 1882 |
| 751,555 | Prescott | Feb. 9, 1904 |
| 858,116 | Sunderman | June 25, 1907 |
| 1,368,934 | Jackson | Feb. 15, 1921 |
| 2,736,480 | Anderson | Feb. 28, 1956 |
| 2,778,387 | Diehl | Jan. 22, 1957 |
| 2,888,046 | Piazze et al. | May 26, 1959 |
| 2,897,854 | Moreland | Aug. 4, 1959 |